(12) United States Patent
Reyneke et al.

(10) Patent No.: US 12,220,693 B2
(45) Date of Patent: Feb. 11, 2025

(54) REACTOR SYSTEM FOR SATURATED C3-C6 HYDROCARBON DEHYDROGENATION

(71) Applicant: Kellogg Brown & Root LLC, Houston, TX (US)

(72) Inventors: Rian Reyneke, Katy, TX (US); Gautham Krishnaiah, Houston, TX (US); Manoji Nagvekar, Sugar Land, TX (US); Mitchell Biondi, Houston, TX (US); Steven Arthur Tragesser, Kingwood, TX (US); Akhilesh Pratap, Sugar Land, TX (US); Froylan Guzman Calderon, Houston, TX (US); Matthew James Griffiths, Arlington Heights, IL (US); Christopher Brian Scharf, Conroe, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 0 days.

(21) Appl. No.: 17/829,818

(22) Filed: Jun. 1, 2022

(65) Prior Publication Data

US 2023/0390722 A1     Dec. 7, 2023

(51) Int. Cl.
*B01J 8/00*     (2006.01)
*B01J 8/18*     (2006.01)
*C10G 11/18*     (2006.01)

(52) U.S. Cl.
CPC .............. *B01J 8/008* (2013.01); *B01J 8/0055* (2013.01); *B01J 8/1863* (2013.01); *C10G 11/18* (2013.01); *B01J 2208/00557* (2013.01); *B01J 2208/06* (2013.01); *C10G 2300/4018* (2013.01); *C10G 2300/70* (2013.01); *C10G 2400/20* (2013.01)

(58) Field of Classification Search
CPC ........ B01J 8/1863; B01J 8/1854; B01J 8/008; B01J 8/0055; B01J 2208/00991
See application file for complete search history.

(56) References Cited

U.S. PATENT DOCUMENTS

| 10,307,721 | B2 | 6/2019 | Li et al. |
| 11,118,117 | B2 | 9/2021 | Vazquez et al. |
| 2011/0116978 | A1 | 5/2011 | Glover et al. |
| 2018/0079700 | A1 | 3/2018 | Pretz |
| 2021/0154635 | A1 | 5/2021 | Doosa et al. |

FOREIGN PATENT DOCUMENTS

EP     3939697 A1     1/2022

OTHER PUBLICATIONS

International Searching Authority; Patent Cooperation Treaty; International Search Report and Written Opinion dated Oct. 20, 2023 for International Application No. PCT/US2023/024177 filed Jun. 1, 2023 (17 pages).

*Primary Examiner* — Lessanework Seifu
(74) *Attorney, Agent, or Firm* — Gary M. Machetta

(57) ABSTRACT

A reactor system and method for catalytic dehydrogenation of saturated C3-C6 hydrocarbons within a reactor placed within a reactor disengager, where the reactor is open at the bottom thereof and open to the disengager, and the exit riser from the reactor is not hard coupled to at least one downstream cyclone. This configuration permits controlling the amount of catalyst within the reactor by varying the level of catalyst in the reactor disengager outside the reactor and permits controlling total catalyst hold-up and/or weight hourly space velocity (WHSV) independently from catalyst flow from the catalyst regenerator.

11 Claims, 3 Drawing Sheets

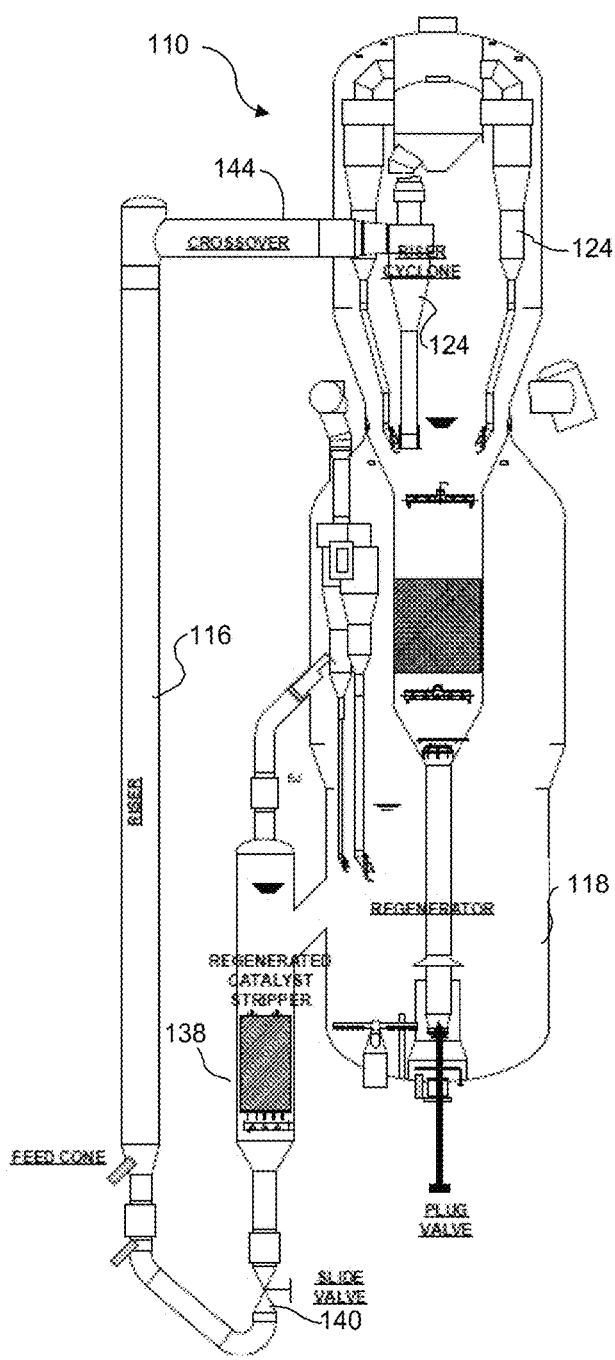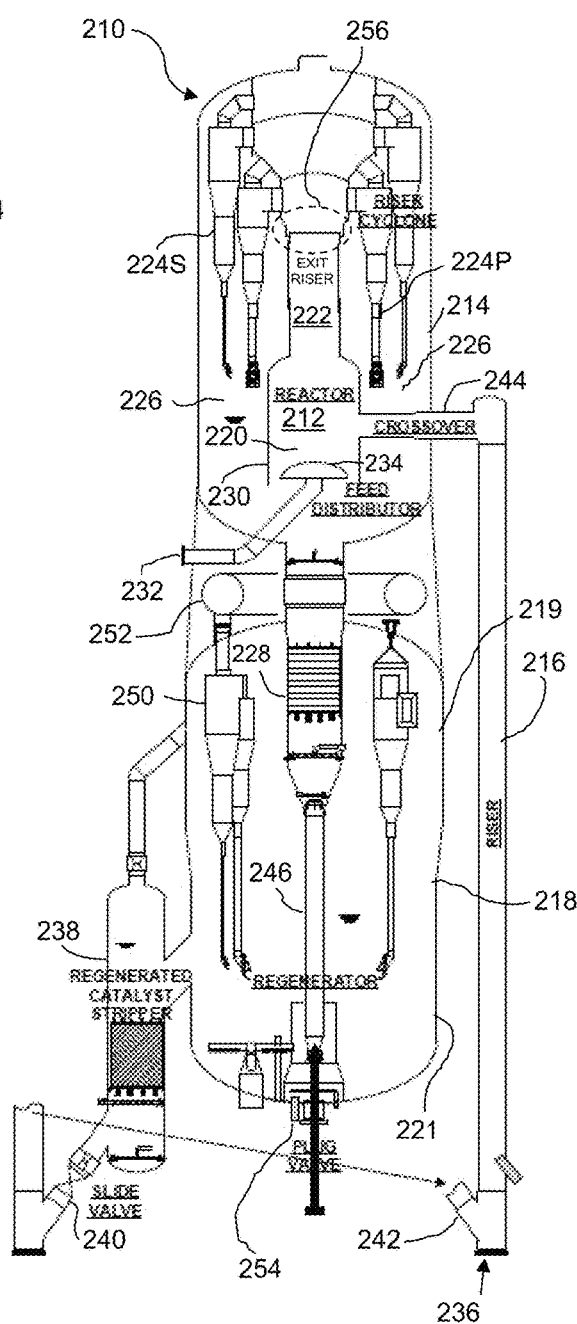
FIG. 1 (Prior Art)　　　　FIG. 2

REACTOR SYSTEM FOR SATURATED C3-C6 HYDROCARBON DEHYDROGENATION

TECHNICAL FIELD

The present invention relates to systems and methods for dehydrogenating saturated C3-C6 hydrocarbons, and more particularly relates to systems and methods for dehydrogenating saturated C3-C6 hydrocarbons having greater control of catalyst hold-up and gas residence times.

BACKGROUND

Technology and the required catalyst have been developed to perform saturated hydrocarbon dehydrogenation reactions in an FCC-type (Fluid Catalytic Cracking) converter. In this discussion, the term "Cx" will be used as a representative molecule for saturated hydrocarbon in the subsequent discussion. For example, in one non-limiting embodiment, Cx refers to all molecules C3 to C6, that is propane (C3), butanes (C4s), pentanes (C5s), and hexanes (C6s).

In the conventional FCC-style reactor designs, the reaction takes place in the dilute phase fluidized riser, where the residence time is typically 2-3 seconds and the gas velocity is in the range of about 45-60 ft/second. In a typical riser design, the WHSV (Weight Hourly Space Velocity, which is the ratio of the feed mass flowrate to mass of catalyst in the reactor) is very high, typically more than 50 $hr^{-1}$. One non-limiting embodiment of an FCC-style reactor design of this type is KBR's ORTHOFLOW™ FCC.

While the concept of WHSV is normally used for fixed-bed reactors, where fixed amounts of catalyst are loaded into the reactors, the effective or instantaneous WHSV can be defined for FCC-style reactors based on the amount of catalyst in contact with the feed at any given time. To achieve the desired conversion (in one non-limiting embodiment, 45% conversion) at favorable reactor temperature and pressure conditions, the WHSV should be much lower, typically in the range of 5-15 $hr^{-1}$, while remaining within the 2-3 second gas contact time range in the primary reaction zone. These conditions cannot easily be accommodated in an FCC-type reactor with conventional riser design.

Fluidized-bed reactors have the ability to process large volumes of fluid. Fluidization occurs when small solid catalyst particles are suspended in an upward-flowing stream of fluid (gas). The fluid velocity is sufficient to suspend the particles, but not large enough to carry them out of the vessel. The solid particles swirl around the bed rapidly, creating excellent mixing with the fluid. The characteristics and behavior of a fluidized bed are strongly dependent on both the solid and liquid or gas properties.

Commercial reactor technology generally uses fixed bed cyclic reactor systems, where multiple reactor beds alternate between reaction and regeneration operation, or a moving-bed continuous catalyst regeneration system with intermediate heating. In these systems the operation is semi-batch with multiple reactors and associated valving required to simulate continuous operation.

Thus, it is desirable to maintain true continuous operation while employing a single reactor/regeneration system easily afforded by a FCC-type reactor/regenerator configuration.

SUMMARY

There is provided, in one non-limiting embodiment, a reactor system for catalytic dehydrogenation of saturated Cx hydrocarbons, where the reactor system includes a reactor disengager, a reactor within the reactor disengager, where the reactor comprises a reactor zone, a catalyst riser in fluid communication with the reactor at an upper end of the catalyst riser and in fluid communication with a regenerated catalyst stripper and a steam source at a lower end of the catalyst riser, an exit riser in fluid communication with an upper end of the reactor, the exit riser in fluid communication with at least one cyclone adapted to separate catalyst from reactor effluent, where the reactor comprises a lower portion thereof that is open and not hard coupled to the at least one cyclone, Further there is provided a method for catalytic dehydrogenation of saturated Cx hydrocarbons including feeding saturated Cx hydrocarbons and dehydrogenation catalyst to a reactor within a reactor disengager, where the reactor comprises a reactor zone comprising a lower portion thereof, dehydrogenating the saturated Cx hydrocarbons in the presence of the dehydrogenation catalyst to give a reactor effluent feeding through an exit riser to at least one cyclone, separating dehydrogenated product from spent catalyst in the at least one cyclone, flowing the spent catalyst down the annular space between the reactor and the reactor disengager to a spent catalyst stripper located below the reactor, where the lower portion of the reactor is open to the disengager and in fluid communication with the spent catalyst flowing down the annular space from the at least one cyclone, and the method further comprises controlling the amount of catalyst within the reactor by varying the level of catalyst in the annular space between the reactor and the reactor disengager.

BRIEF DESCRIPTION OF THE DRAWINGS

FIG. 1 is a non-limiting, schematic illustration of a conventional reactor system for catalytic dehydrogenation of saturated Cx hydrocarbons;

FIG. 2 is a non-limiting, schematic illustration of one version of the reactor system for catalytic dehydrogenation of saturated Cx hydrocarbons described and illustrated herein;

Figure 3:
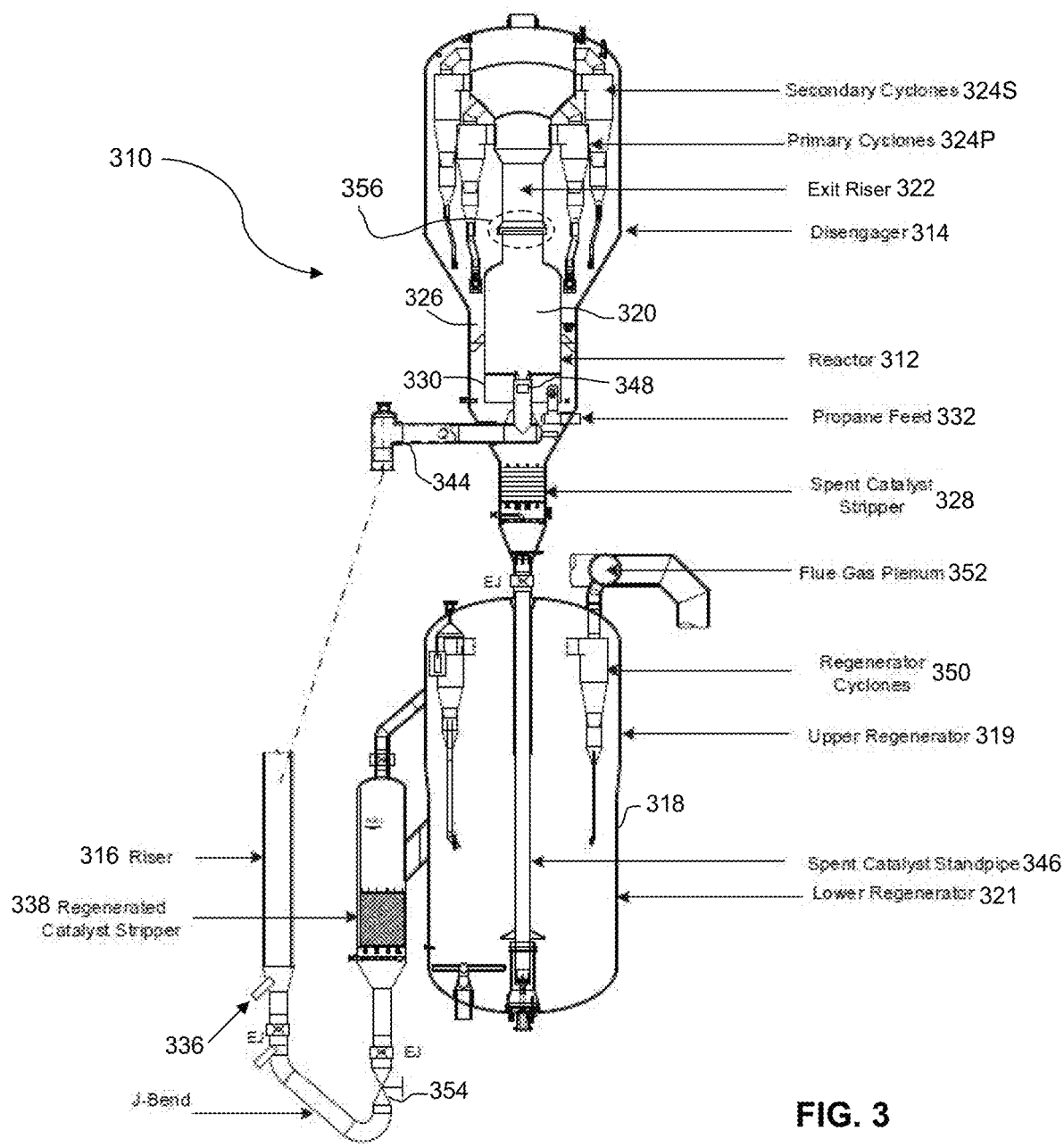
FIG. 3 is a different, non-limiting, schematic illustration of another embodiment of the reactor system for catalytic dehydrogenation of saturated Cx hydrocarbons described and illustrated herein

It will be appreciated that the drawings are schematic illustrations and that the invention is not limited to the design, proportions, or specific equipment shown in the drawings.

DETAILED DESCRIPTION

A goal of the subject invention is to provide a reactor for Cx dehydrogenation where the WHSV can operate in the range of 5-15 $hr^{-1}$ while at the same time being able to get most if not all the benefits of conventional FCC-type conversion systems, such as the KBR FCC ORTHOFLOW™ design, to give one non-restrictive example. Presented in FIG. 1 is a schematic illustration of such a conventional reactor system. This invention addresses the following:

How to achieve low WHSV in the 5-15 $hr^{-1}$ range with a 2-3 second gas contact time in an FCC-style dilute phase fluidized reactor.

How to provide a way to adjust the WHSV for the reaction without impacting the overall reactor heat balance.

Another important parameter in the reactor design is the Gas Residence Time, where in one non-limiting embodiment the target is in the 1-2 second range within the reactor zone. The gas residence time is the reciprocal of the Gas Hourly Space Velocity (GHSV), which for an external riser reactor 116 is defined based on the volume of the riser (see FIG. 1). Gas residence time is also a function of the gas voidage, expressed as (reactor volume×gas voidage)/volume flow.

Part of the concept of the system and method described herein is to add a relatively large-diameter reactor section that achieves a much higher fluidized catalyst bed density than that achieved by a conventional riser by reducing the velocity of the gas moving upwards through the reaction zone—that is, by shifting from a dilute phase regime to a fast fluidized regime. This design provides the desired WHSV and gas residence time. In one non-limiting embodiment, the desired WHSV can range from about 5 to about 15 $hr^{-1}$; alternatively, the WHSV is from about 10-15 $hr^{-1}$. In another non-restrictive version, the desired gas residence time can range from about 0.5 to about 3 seconds; alternatively, from about 1 to about 2 seconds; and in another non-limiting embodiment less than 1 second within the reactor.

As defined herein, "relatively large-diameter reactor" means that the reactor has a length and a diameter and the ratio of length to diameter, ID, ranges from about 1:1 Independently to about 5:1; alternatively, from about 2:1 independently to about 3:1. That is, the reactor is the typical shape of a vessel, rather than the typical shape of a riser or pipe. As used herein with respect to a range, the word "independently" means that any endpoint may be used together with any other endpoint to give a suitable alternative range.

It should be appreciated that while these challenges of a FCC-type reactor are addressed in the design discussed herein for dehydrogenation reactions, these designs and methods are not limited to dehydrogenation reactions and are expected to be applicable to other reactions.

It is realized that other reactor designs include the possible concept of a large-diameter reaction section at either the top or bottom of the riser. However, what distinguishes this design and method from others are the following features.

Stacked Reactor-Regenerator Configuration

With reference to FIG. 2 illustrating one non-limiting, schematic version of the reactor system 210 for catalytic dehydrogenation of saturated C3-C6 hydrocarbon:
a) The reactor section 212 is located inside the reactor disengager 214 (stacked reactor-regenerator configuration) as shown in FIG. 2 as contrasted with at the top or bottom of an external riser.
b) The external riser 216 is not used for reaction, but only to transport catalyst from the regenerator 218 into the reaction zone 220, which eliminates the additional feed gas residence time in the riser. This is in contrast to using external riser reactor 116 as the reactor in the prior configuration shown in FIG. 1. Steam, introduced at 236, is used as catalyst lifting medium and serves the added purpose of also lowering the hydrocarbon partial pressure to improve reaction selectivity.
c) Catalyst and reaction products leave the reactor 212 through the exit riser 222, which operates in the typical riser dilute flow regime. The exit riser 222 feeds a series of primary cyclones 224P followed by secondary cyclones 224S in series to separate catalyst from the reactor effluent.
d) Quench gas is introduced after the first set of cyclones 224P via quench gas feed (not shown) to drop the gas temperature by approximately 25° C. (in one non-limiting embodiment) and inhibit further cracking reactions. Quench gas is introduced before the second set of cyclones 224S.
e) Catalyst separated in the cyclones 224 flows down the disengager 214 through the annular area 226 between the reactor 212 and disengager 214 to the spent catalyst stripper 228.
f) The reactor section 212 is open at the bottom 230 which provides the advantage that the amount of catalyst within the reactor section 212 can be controlled by varying the level of catalyst in the annular section 226 of the disengager 214 outside the reactor 212. This design enables the total catalyst hold-up/WHSV to be controlled independently from the regenerated catalyst flow from the regenerator 218; and therefore, the WHSV in the reactor 212 can be varied without impacting the heat balance. Regenerated catalyst flows from regenerator 218 to regenerated catalyst stripper 238, and stripped regenerated catalyst flows through slide valve 240 and is introduced into inlet 242 to be lifted by steam 236 introduction into reactor 212 through crossover 244. Regenerator 218 also comprises upper regenerator 219, lower regenerator 221, and regenerator cyclones 250. Flue gas from regenerator cyclones 250 exits via flue gas plenum 252.
g) Notably, the exit riser 222 is not hard coupled (gap 256) to the cyclones 224 which allows pressure equalization with the dilute space in the reactor disengager 226 facilitating the level variation discussed above at f). In more detail, the cyclones 224 are hard coupled to the top of the exit riser 222 (negative pressure closed cyclone system). There is a gap 256 in the riser 222 before the first cyclone 224P to allow dipleg gases and steam to exit the reactor 212 through the cyclone system. The exact position of gap 256 is not critical; for instance, it may be between the cyclones 224P and 224S. Level variation in the annular area 226 is controlled independently by opening and closing spent catalyst slide valve 240 to vary the level.
h) The Cx feed 232 to the reactor 212 is introduced to the bottom 230 of the reactor 212 through a distributor 234. In one non-limiting embodiment, the distributor 234 has the appearance of a mushroom top or any other suitable shape to distribute the saturated hydrocarbon feed into the reactor 212.
i) in another non-limiting embodiment, KBR's Closed Cyclone system is utilized to minimize gas residence time.
j) KBR's proven unique regenerator heating system (KCOT™) may also be employed, in another non-restrictive version.

Alternative Reactor-Regenerator Configuration

Shown in FIG. 3 is a non-restrictive, alternative, schematic version of the reactor system 310 for catalytic dehydrogenation of saturated Cx hydrocarbons.
a) The reactor section 312 is located inside the reactor disengager 314 in a different stacked reactor-regenerator configuration as shown in FIG. 3 as contrasted with at the top or bottom of an external riser.
b) Again, the external riser 316 is not used for reaction, but only to transport catalyst from the regenerator 318 into the reaction zone 320, which eliminates the additional feed gas residence time in the riser. This is in contrast to using external riser reactor 116 as the reactor in the prior configuration shown in FIG. 1. Steam, introduced at 336, is used as catalyst lifting medium and serves the added purpose of also lowering the hydrocarbon partial pressure to improve reaction selectivity.

c) Catalyst and reaction products leave the reactor 312 through the exit riser 322, which operates in the typical riser dilute flow regime. The exit riser 322 feeds a series of cyclones 324 (primary cyclones 324P and secondary cyclones 324S) to separate catalyst from the reactor effluent.

d) Quench gas is introduced after the first set of cyclones 324P via quench gas feed (not shown) to drop the gas temperature by approximately 25° C. (in one non-limiting embodiment) and inhibit further cracking reactions. Quench gas is introduced before the second set of secondary cyclones 324S.

e) Catalyst separated in the cyclones 324P and 324S flows down the disengager 314 through the annular area 326 between the reactor 312 and disengager 314 to the spent catalyst stripper 328.

f) The reactor section 312 is open at the bottom 330 thereof which provides the advantage that the amount of catalyst within the reactor section 312 can be controlled by varying the level of catalyst in the annular section 326 of the disengager 314 outside the reactor 312. This design again enables the total catalyst hold-up/WHSV to be controlled independently from the catalyst flow from the regenerator 318; and therefore, WHSV in the reactor 312 can be varied without affecting the heat balance. Regenerated catalyst flows from regenerator 318 to regenerated catalyst stripper 338, and stripped regenerated catalyst flows through slide valve 340 and introduced into riser 316 to be lifted by steam 336 introduction into reactor 312 through crossover 344. Regenerator 318 also comprises upper regenerator 319, lower regenerator 321, and regenerator cyclones 350. Flue gas from regenerator cyclones 350 exits via flue gas plenum 352.

g) Notably, the exit riser 322 is not hard coupled (there is a gap 356) to the cyclones 324 which allows pressure equalization with the dilute space in the reactor disengager 326 facilitating the level variation discussed above at f). Details given above with respect to the stacked reactor-regenerator configuration in FIG. 2 at g) are equally applicable to this alternative configuration.

h) The Cx feed 332, e.g., propane feed, to the reactor 312 is introduced to the bottom 330 of the reactor 312 in a non-limiting embodiment through a ring-type distributor. Other suitable distributor types include, but are not necessarily limited to grid types, mushroom types or any suitable design that gives thorough distribution.

i) Regenerated catalyst and lift steam enters the bottom 330 of the reactor 312 via crossover 344 through openings 348 as an alternative to direct introduction to reactor 312 from crossover 344. In one non-limiting embodiment, the open slots 348 distribute the regenerated catalyst and lift steam into the reactor 312. The shape and number of the openings 348 are not critical so long as good distribution of the regenerated catalyst and lift steam into reaction zone 320 is achieved.

Other details of the alternative system 310 in FIG. 3 are similar to those of the system 210 in FIG. 2.

Side-by-Side Reactor-Regenerator Configuration

Figure 4:
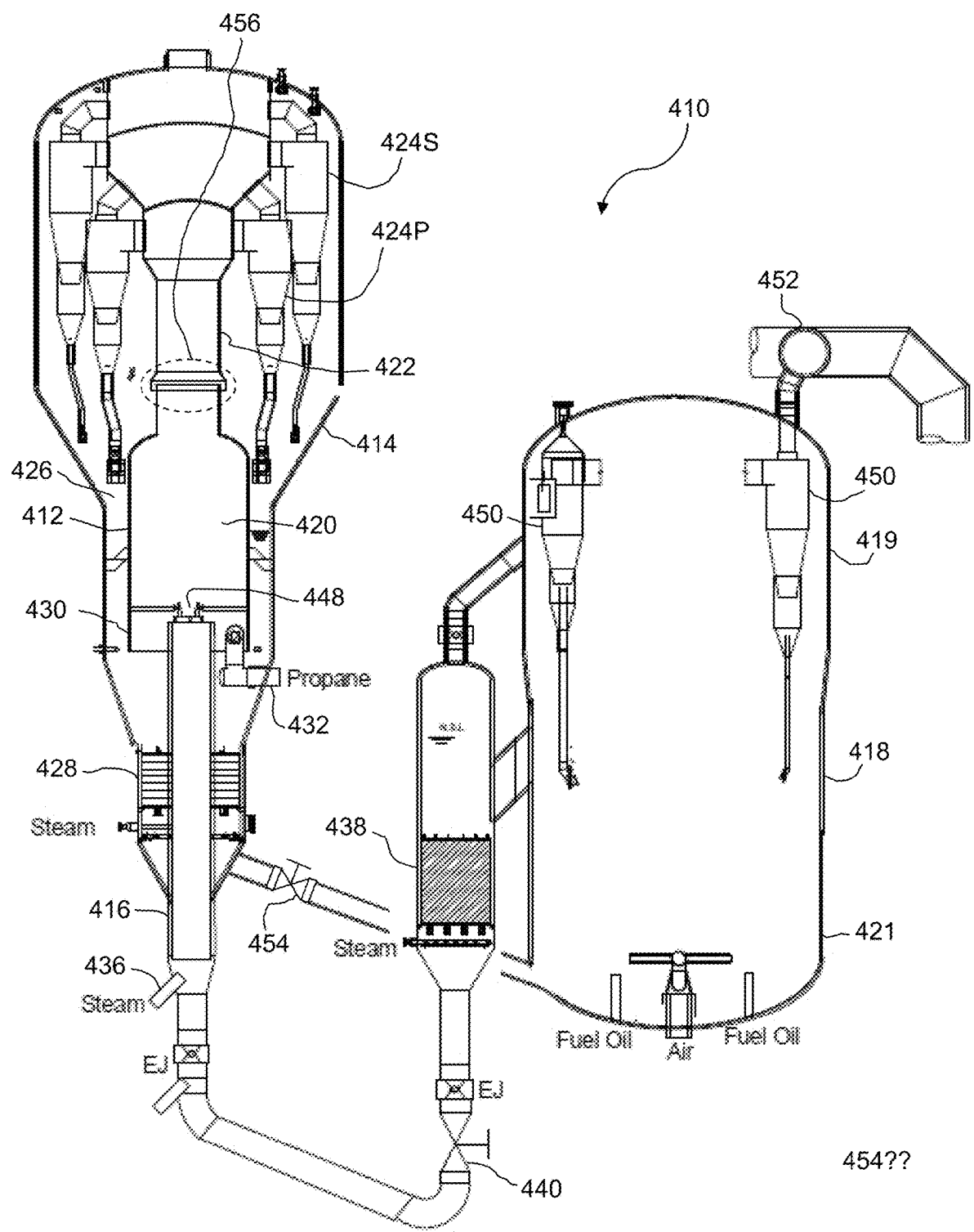
FIG. 4 is another, non-restrictive schematic illustration of a different embodiment of the reactor system schematically presenting a side-by-side configuration.

A second configuration, more precisely a side-by-side reactor-regenerator configuration, is also envisaged and shown in FIG. 4. This configuration is very similar to the configuration shown in FIG. 3 except that the disengager 414 comprising reactor 412 is laterally displaced from its position shown in FIG. 3 as shown in FIG. 4. In the non-limiting embodiment of FIG. 4, it is positioned over riser 416 (to the left and optionally downward relative to the FIG. 3 embodiment). In an optional embodiment, disengager 414 and reactor 412 may be coaxial with riser 416. Thus, the reactor 412 and regenerator 418 are in a side-by-side relationship, rather than in a stacked relationship. In more detail:

a) The riser 416 (external or internal) is used for transporting catalyst from the regenerator 418 into the reactor 412.

b) For an external riser 416, see the description at subparagraphs a) to j) under "Stacked Reactor-Regenerator Configuration" discussed above.

c) For an internal riser 416, a portion of the riser 416 can also be used for reaction. When used for effecting the reaction, the Cx feed is introduced in the riser 416 such that riser reaction zone section or length is minimized.

d) Steam 436 is used as the main catalyst lifting medium in the riser 416 and serves the added purpose of also lowering the hydrocarbon partial pressure to improve reaction selectivity.

e) Catalyst and reaction products leave the reactor 412 through the exit riser 422, which operates in the typical riser dilute flow regime. The exit riser 422 feeds cyclones 424P and 424S in series to separate catalyst from the reactor effluent.

f) Quench gas is introduced after the primary cyclones 424P via quench gas feed (not shown) to drop the gas temperature by approximately 25° C. and inhibit further cracking reactions. Quench gas is introduced before the secondary cyclones 424S.

g) Catalyst separated in the cyclones 424 flows down the disengager 414 through the annular area 426 between the reactor 412 and disengager 414 to the spent catalyst stripper 428.

h) As discussed above, the reactor section 412 is open at the bottom 430 which provides the advantage that the amount of catalyst within the reactor 412 can be controlled by varying the level of catalyst in the annular section 426 of the disengager 414 outside the reactor 412. This design enables the total catalyst hold-up/WHSV to be controlled independently from the catalyst flow from the regenerator 418; and therefore, the WHSV in the reactor 412 can be varied without impacting the heat balance.

i) Once more, the exit riser 422 is not hard coupled (there is a gap 456) to the cyclones 424 which allows pressure equalization with the dilute space in the reactor disengager 426 facilitating the level variation discussed in f). Again, details give above with respect to the stacked reactor-regenerator configuration in FIG. 2 at g) and the alternative reactor-regenerator configuration in FIG. 3 at g) are equally applicable to this side-by-side configuration.

j) Additional Cx feed 432 to the reactor 412 can also be introduced to the bottom of the reactor 412 through a distributor as previously described.

Other details of the side-by-side system are similar to those of the stacked reactor-regenerator system and alternative reactor-regenerator system previously described. For instance, slide valve 454 in FIG. 4 corresponds to plug valve 354 in FIG. 3. In some embodiments, it is expected that the stacked configuration will have a relatively smaller footprint; alternatively, the side-by-side system will be suitable when vertical space is at a premium.

In the designs of this system (FIGS. 2, 3, and 4), the catalyst in the reactor (212, 312, 412) is a combination of regenerated catalyst entering from the riser (216, 316, 416) and spent catalyst entering the bottom of the reactor (212, 312, 412) from the disengager (214, 314, 414). The reactor effluent and catalyst leave the reactor (212, 312, 412) through the exit riser (222, 322, 422) which operates in the typical riser flow regime.

Four main components enter the internal reactor: fresh regenerated catalyst; spent catalyst; steam; and Cx feed. This section describes some additional features and potential arrangements for introducing these components.

Regenerated Catalyst

Regenerated catalyst along with lift steam (236, 336) is transferred from the vertical external riser (216, 316) via a crossover duct (244, 344) to the side of the internal reactor (212, 312) in a non-limiting embodiment. The catalyst is introduced above the Cx feed distributor (234) (see FIG. 2). This can be achieved utilizing one or more risers.

Regenerated catalyst along with lift steam (236, 336) is transferred from the vertical external riser (216, 316) via a horizontal crossover duct (244, 344), and additional internal vertical riser, to the center of the bottom of the internal reactor. The catalyst is introduced at approximately the same level as the Cx feed distributor (234). Catalyst is distributed across the cross-sectional area of the reactor (212, 312) via a catalyst distributor (openings 348 in the vertical riser or other suitable catalyst distribution device; see FIG. 3).

In the side-by-side reactor-regenerator configuration, with an internal riser, regenerated catalyst and lift steam (436) and optionally Cx is transferred from the vertical internal riser to, in one non-limiting embodiment, the center of the Internal reactor (412). The catalyst is introduced, in another non-limiting embodiment, above or at the same level as (if present) an additional Cx feed distributor 432 (see FIG. 4). This can be achieved utilizing one or more risers 416.

Cx Feed

Cx can be introduced via a distributor 234 at the bottom of the internal reactor 212 (see FIG. 2).

The Cx distributor 234 may be a mushroom/dome type, grid type, ring type, riser nozzles or any other type of distributor suitable for introducing the Cx Into the internal reactor or riser.

The Cx distributor 234 is designed to enable good coverage of the entire cross-sectional area of the reactor (212, 312, 412); and ensures intimate contacting of catalyst and Cx feed.

Cx can also be introduced into the horizontal crossover (244, 344) or into the riser to promote better mixing before entering the reactor (212, 312)—this can be implemented in either the bottom entry or side entry arrangement.

In the reactor design described herein, Cx along with the steam (236, 336, 436) enables a fast fluidized catalyst bed reactor system where the required WHSV is achieved.

Spent Catalyst

Spent catalyst is introduced via the cyclone diplegs after separation of the catalyst from the product gas in the cyclones (224, 324, 424), and enters the annular space (226, 326, 426) between the internal reactor (212, 312, 412) and the disengager (214, 314, 414) wall.

Spent catalyst enters the internal reactor (212, 312, 412) via an open bottom (230, 330) and mixes with the Cx feed (232, 332, 432) and fresh regenerated catalyst. The sequence of first mixing Cx feed with lower-temperature spent catalyst and then with fresh catalyst has potential yield advantages. Again, the catalyst bed below and around the reactor (212, 312, 412) is the relatively dense phase.

A dense catalyst bed is maintained below the reactor (212, 312) and in the annular space (226, 326) between the internal reactor (212, 312) and the disengager (214, 314) wall.

Spent catalyst not recycled flows into the stripper vessel (238, 338, 438) below the internal reactor (212, 312, 412) and then the regenerator (218, 318, 418) where it is regenerated and fed back to the internal reactor (212, 312, 412).

Catalyst Bed Adjustment

Catalyst hold-up (or WHSV) in the reactor vessel (212, 312, 412) can be varied by changing the amount of recirculating spent catalyst returning from the cyclone diplegs, and entering the reactor (212, 312, 412) through the open bottom of the reactor (212, 312, 412).

The design includes the flexibility to vary catalyst elevation in the annular space (226, 326, 426) outside of the reactor (212, 312, 412). This enables control of the amount of spent catalyst that is recirculated back into the reactor (212, 312, 412). The concept is based on catalyst bed hydraulics. A higher annular bed level results in increased pressure head, and this pushes more spent catalyst into the reactor (212, 312, 412). Conversely, a lower annular bed level results in a lower pressure head, and this reduces the amount of spent catalyst into the reactor (212, 312, 412).

The reactor bed density is typically lower than the bed density in the annular space around the reactor (212, 312, 412) and the bed density below the reactor (212, 312, 412), but controlling annular bed elevation via the spent catalyst plug valve/slide valve (254, 354, 454) allows regulation of the spent catalyst recirculation regardless of the bed density in the annular section (226, 326, 426). The difference in bed densities will impact the ultimate elevation of the catalyst bed in the annular space (226, 326, 426), but as long as there is flexibility to vary the annular space (226, 326, 426) bed height, it does not really matter what the annular bed density is. In one non-limiting embodiment, the annular bed density is ideally about 30-40 $lb/ft^3$, but the concept, design, and method described herein can operate outside this range.

This annular bed catalyst level is controlled via regulation of the spent catalyst plug valve (254, 354) in a stacked design of FIGS. 2 and 3, or a slide valve (454) in a side-by-side design, such as in FIG. 4. Close the valve (254, 354, 454) to increase catalyst inventory/annular bed elevation. Open the valve (254, 354, 454) to decrease catalyst inventory/annular bed elevation. This is similar to how the reactor/stripper bed level is maintained in a typical FCC, but now it is operating with a wider level range.

The cyclone system is hard coupled to the top of the exit riser (222, 322, 422). The bottom of the exit riser (222, 322, 422) is attached to the reactor (212, 312, 412). There is a gap (256, 356, 456) in the exit riser (222, 322, 422) before the first stage cyclones (224P, 324P, 424P) to allow dipleg gases and steam to exit the disengager (214, 314, 414) dilute phase through the respective cyclone systems; and allow pressure equalization between the disengager (214, 314, 414) dilute phase and the cyclone system. Pressure at the inlet to the first stage cyclone (224P, 324P, 424P) is equal to the disengager (214, 314, 414) dilute phase pressure. As previously mentioned, this pressure equalization gap (256, 356, 456) can be located before the primary cyclones (224P, 324P, 424P); in between primary cyclones (224P, 324P, 424P) and secondary cyclones (224S, 3243, 424S); or after the secondary cyclones (224S, 324S, 424S). The location illustrated in FIGS. 2, 3, and 4 before the primary cyclones (224P, 324P, 424P) is suitable in one non-limiting embodiment.

Catalyst bed level in the annular section (226, 326, 426) does not influence the cyclone pressure balance. In any event, the pressure equalization feature enables the whole system to work correctly. Without the pressure equalization feature, the disengager dilute phase pressure would keep increasing as there is no place for steam and dipleg gases to escape. The cyclone system would not operate correctly. Further, it would become increasingly difficult to control the annular bed level and spent catalyst recirculation.

The amount of catalyst in a typical FCC riser is varied by increasing catalyst circulation (by a number of means such as reactor temperature increase, feed temperature decrease, etc.). These adjustments also change the heat balance.

However, in the present system by contrast the amount of catalyst in the reactor can be varied by changing the spent catalyst recirculation amount without impacting the heat balance—the amount of catalyst circulated does not change. WHSV adjustment is independent of the catalyst circulation/regenerated catalyst flow.

Steam

Steam (236, 336, 436) is used to lift the regenerated catalyst up the external or internal riser (216, 316, 416) and into the reactor (212, 312, 412).

It will be appreciated that other gases (e.g., $N_2$) and/or vapors may also be used as a catalyst lift medium.

One non-limiting advantage to the system and method described herein is that the low WHSV required by a Cx dehydrogenation reaction can be accommodated in an FCC-type reactor. Conventional fixed-bed reaction systems suffer from cyclical operation and associated maintenance problems, while using an FCC-type reaction avoids cyclical operation and has continuous catalyst make-up.

In the foregoing specification, the invention has been described with reference to specific embodiments thereof. However, the specification is to be regarded in an illustrative rather than a restrictive sense. For example, equipment, risers, reactors, disengagers, columns, regenerators, valves, gaps, processes, reactants, saturated hydrocarbons, products, and operating conditions falling within the claimed or disclosed parameters, but not specifically identified or tried in a particular example, are expected to be within the scope of this invention.

The present invention may be practiced in the absence of an element not disclosed. In addition, the present invention may suitably comprise, consist or consist essentially of the elements disclosed. For instance, there may be provided a reactor system for catalytic dehydrogenation of saturated Cx hydrocarbons, where the reactor system comprises, consists essentially of, or consists of, a reactor disengager; a reactor within the reactor disengager, where the reactor comprises a reactor zone; a catalyst riser in fluid communication with the reactor at an upper end of the catalyst riser and in fluid communication with a regenerated catalyst stripper and a steam source at a lower end of the catalyst riser; and an exit riser in fluid communication with an upper end of the reactor, the exit riser in fluid communication with at least one cyclone adapted to separate catalyst from reactor effluent; where the reactor comprises a lower portion thereof that is open to the reactor disengager.

There may be further provided a method for catalytic dehydrogenation of saturated Cx hydrocarbons comprising, consisting essentially of, or consisting of feeding saturated Cx hydrocarbons and dehydrogenation catalyst to a reactor within a reactor disengager, where the reactor comprises a reactor zone comprising a lower portion thereof; dehydrogenating the saturated Cx hydrocarbons in the presence of the dehydrogenation catalyst to give a reactor effluent feeding through an exit riser to at least one cyclone; separating dehydrogenated product from spent catalyst in the at least one cyclone; flowing the spent catalyst down an annular space between the disengager and the reactor to a spent catalyst stripper followed by a catalyst regenerator; where the lower portion of the reactor is open to the disengager and in fluid communication with the annular space, and the method further comprises controlling the amount of catalyst within the reactor by varying the level of catalyst in the annular space.

The words "comprising" and "comprises" as used throughout the claims, are to be interpreted to mean "including but not limited to" and "includes but not limited to", respectively.

As used herein, the word "substantially" shall mean "being largely but not wholly that which is specified."

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

The invention claimed is:

1. A reactor system for catalytic dehydrogenation of saturated Cx hydrocarbons, where the reactor system comprises:
   a reactor disengager;
   a reactor within the reactor disengager, where the reactor comprises a reactor zone;
   a catalyst riser in fluid communication with the reactor at an upper end of the catalyst riser and in fluid communication with a regenerated catalyst stripper and a steam source at a lower end of the catalyst riser; and
   an exit riser in fluid communication with an upper end of the reactor, the exit riser in fluid communication with at least one cyclone adapted to separate catalyst from reactor effluent;
   where the reactor comprises a lower portion thereof that is open to the reactor disengager.

2. The reactor system of claim 1 where the reactor has a length and a diameter and the ratio of length to diameter ranges from about 1:1 to about 5:1.

3. The reactor system of claim 1 where the exit riser is open to the at least one cyclone.

4. The reactor system of claim 1 where the disengager has a lower portion thereof in fluid communication with a catalyst regenerator.

5. The reactor system of claim 1 where the at least one cyclone comprises a primary cyclone and a secondary cyclone, and further comprising a quench gas feed downstream from the primary cyclone and upstream of the secondary cyclone.

6. The reactor system of claim 1 further comprising a saturated Cx hydrocarbon feed in fluid communication with the lower portion of the reactor.

7. The reactor system of claim 6 where the reactor has an open bottom and where the saturated Cx hydrocarbon feed in fluid communication with the lower portion of the reactor feeds a distributor in the bottom of the reactor.

8. The reactor system of claim 1 where the reactor and reactor disengager are positioned above a catalyst regenerator and the catalyst riser is external to the disengager and the catalyst regenerator.

9. The reactor system of claim 1 where the reactor and reactor disengager are positioned to the side of a catalyst regenerator and the catalyst riser is external or internal to the disengager and the catalyst regenerator.

10. The reactor system of claim 9 where in the case where the catalyst riser is internal to the disengager, at least a portion of the catalyst riser is a reactor.

11. A reactor system for catalytic dehydrogenation of saturated C3-C6 hydrocarbons, where the reactor system comprises:
   a reactor disengager;
   a reactor within the reactor disengager, where the reactor comprises a reactor zone;
   a catalyst riser in fluid communication with the reactor at an upper end of the catalyst riser and in fluid communication with a regenerated catalyst stripper and a steam source at a lower end of the catalyst riser; and
   an exit riser in fluid communication with an upper end of the reactor, the exit riser in fluid communication with
   at least one cyclone adapted to separate catalyst from reactor effluent;
   where:
   the reactor comprises a lower portion thereof that is open to the reactor disengager and not hard coupled to the at least one cyclone;
   the reactor has a length and a diameter and the ratio of length to diameter ranges from about 1:1 to about 5:1.

* * * * *